A. E. SWANSON.
ANIMAL TRAP.
APPLICATION FILED JAN. 14, 1911.

1,028,633.

Patented June 4, 1912.

WITNESSES
N. Meem.

INVENTOR
Arvid E. Swanson
By Masan Fenwick Lawrence
ATTORNEYS

UNITED STATES PATENT OFFICE.

ARVID E. SWANSON, OF SPOKANE, WASHINGTON, ASSIGNOR OF ONE-HALF TO THOMAS OLSON, OF DOVER, IDAHO.

ANIMAL-TRAP.

1,028,633. Specification of Letters Patent. Patented June 4, 1912.

Application filed January 14, 1911. Serial No. 602,714.

*To all whom it may concern:*

Be it known that I, ARVID E. SWANSON, a citizen of the United States, residing at Spokane, in the county of Spokane and State of Washington, have invented certain new and useful Improvements in Animal-Traps; and I do hereby declare the following to be a full, clear, and exact description of the invention, such as will enable others skilled in the art to which it appertains to make and use the same.

This invention relates to animal traps and has for an object to provide a trap embodying new and improved features of utility, reliability and convenience.

A further object of the invention is to provide an improved form of trap to be placed in the burrow of a burrowing animal to conform substantially to the size and general contour of the burrow and to confine the animal within such trap when the animal enters in passing through the burrow.

With these and other objects in view the invention comprises certain novel constructions, combinations and arrangement of parts as will be hereinafter more fully described and claimed.

Figure 1:
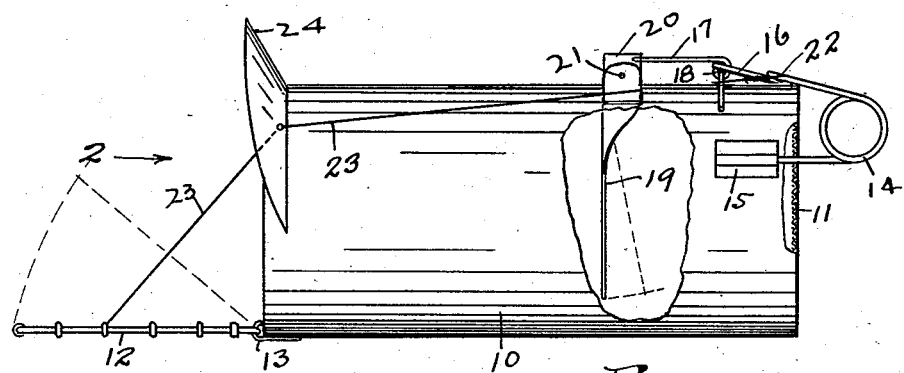
Figure 2:
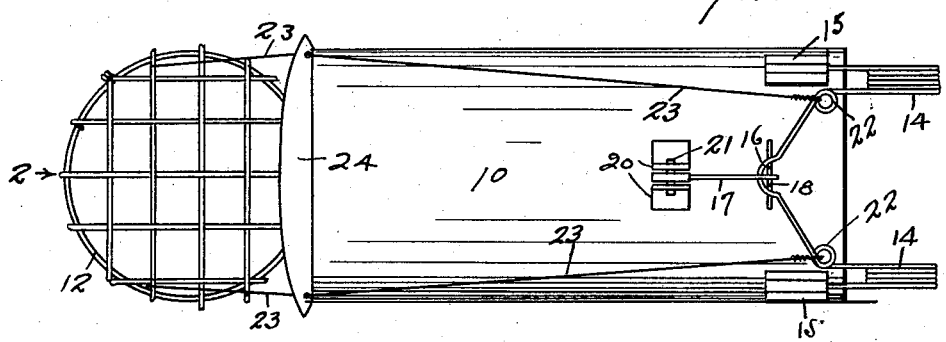
Figure 3:
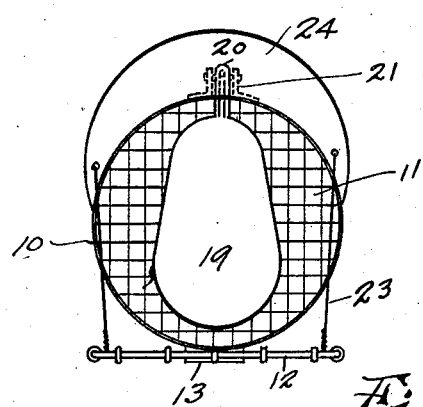

In the drawings: Figure 1, is a view of the trap in side elevation with parts broken away. Fig. 2, is a view of the trap in top plan. Fig. 3, is a view of the trap in end elevation as indicated by arrow 2 at Figs. 1 and 2.

Like characters of reference designate corresponding parts throughout the several views.

The trap body comprises a tube 10, preferably though not necessarily substantially cylindrical in form and also preferably though not necessarily constructed of sheet metal. At one end the cylinder 10 is closed by an end wall 11 preferably of wire mesh or other screen fabric while at the opposite end a gate 12 is hinged as at 13 to the bottom of the cylinder 10. The gate 12 is also preferably screen fabric and is proportioned to close the open end of the cylinder opposite the wall 11.

To close the gate 12 a spring 14 is rigidly secured upon the exterior of the cylinder as at 15 and provided centrally with a loop 16, engaged by a keeper 17, pivoted as at 18 and held over the loop 16 by means of a trigger 19 having a hook 20 engaging such keeper 17. The trigger 19 is pivoted at 21 and when in the position shown in full lines in Fig. 1 the keeper 17 is engaged by the hook 20 and maintained against displacement. When, however, the trigger 19 is moved to the position shown in dotted lines at Fig. 1 the hook 20 releases the keeper 17 and the spring 14 then straightens. The spring 14 is provided with eyes 22 which engage flexible connections 23 which may be cords, wires, chains or other approved flexible connections the opposite ends of which are connected with the gate 12 as indicated. The open or gated end of the cylinder 10 is also provided with a hood or deflector 24 so that in case the burrows are larger than the cylinder the whole burrow is closed by the addition of the hood 24, holes being provided in such hood through which the flexible connections pass.

In operation the cylinder 10 is inserted in the burrow of the animal in any approved manner as by opening the burrow or placing the apparatus in the mouth of the burrow as the position of the burrow and the habits of the animal may make desirable or necessary. Before inserting, the spring is engaged in the manner shown at Fig. 1 and the gate 12 opened. The gate 12 being of screen formation may be loosely covered with dirt, leaves or the like so that the animal entering or passing through the burrow will not notice the existence of the gate and will pass directly on into the cylinder 10 and come into contact with the trigger 19 whereupon the spring 14 will be liberated to close the gate 12. It will be noted that the cord 23 is wholly upon the exterior of the cylinder and not in position to be gnawed asunder by the trapped animal.

I claim:

An animal trap comprising a substantially cylindrical casing closed at one end by a stationary screen and at the opposite end by a hinged screen, a spring secured to the end of the casing provided with the stationary screen and extending above the casing, cables passing from the spring along the exterior of the casing and connected to the hinged screen end, a trigger pivoted upon the exterior of the casing and extending downwardly into the casing, a keeper pivoted upon the exterior of the casing and hooked through the spring and engaged by the trigger, and a hood extending from the end of the casing having the hinged closure and provided with openings through which the cables pass.

In testimony whereof I affix my signature in presence of two witnesses.

ARVID E. SWANSON.

Witnesses:
  H. E. SMITH,
  V. A. BECHT.

Copies of this patent may be obtained for five cents each, by addressing the "Commissioner of Patents, Washington, D. C."